United States Patent
Nagase et al.

[15] 3,685,868
[45] Aug. 22, 1972

[54] VARIABLE LOAD BRAKE CONTROL APPARATUS

[72] Inventors: Minoru Nagase; Toshiyuki Matsuoka, both of Kobe, Japan

[73] Assignee: The Nippon Air Brake Co., Ltd., Kobe, Japan

[22] Filed: March 8, 1971

[21] Appl. No.: 122,048

[30] Foreign Application Priority Data

March 10, 1970 Japan ...................... 45/20245

[52] U.S. Cl. ..................... 303/22 R, 188/195, 303/20
[51] Int. Cl. .............................................. B60t 8/20
[58] Field of Search ....... 180/100; 188/195; 235/201; 303/6 C, 20, 22

[56] References Cited

UNITED STATES PATENTS

| | | | |
|---|---|---|---|
| 3,425,752 | 2/1969 | Pollinger et al. | 303/22 A X |
| 3,503,656 | 3/1970 | Shattock et al. | 303/22 R |
| 3,588,454 | 6/1971 | Pfeiffer | 235/201 FS |
| 3,606,484 | 9/1971 | Dressler, Jr. | 303/22 R X |

*Primary Examiner*—Milton Buchler
*Assistant Examiner*—Stephen G. Kunin
*Attorney*—Ralph W. McIntire, Jr.

[57] ABSTRACT

A variable load detection apparatus in which a code generator is provided comprising a sensing plate having a plurality of openings arranged to quantify the sensing plate to provide a plurality of code stages and a plurality of jet sensors adapted to detect different code stages resulting from displacement of the sensing plate incident to varying load conditions. The sensing plate openings are arranged to cause the jet sensors to generate a binary-weighted gray code which is converted by encoder circuitry into standard binary-weighted code form. The encoder outputs are connected to pilot different ones of a plurality of interface valves comprising a power stage for driving a differential diaphragm-type relay valve which may be advantageously utilized to vary the percentage of brake pressure on a rail vehicle as a function of the vehicle load condition.

13 Claims, 7 Drawing Figures

PATENTED AUG 22 1972 3,685,868

INVENTOR.
MINORU NAGASE
TOSHIYUKI MATSUOKA
BY Ralph W. McIntire, Jr.
ATTORNEY

| STAGE | JET SENSOR OUTPUTS | | |
|---|---|---|---|
| | A | B | C |
| 0 | 0 | 0 | 0 |
| 1 | 0 | 0 | 1 |
| 2 | 0 | 1 | 1 |
| 3 | 0 | 1 | 0 |
| 4 | 1 | 1 | 0 |
| 5 | 1 | 1 | 1 |
| 6 | 1 | 0 | 1 |
| 7 | 1 | 0 | 0 |

Fig. 5

INVENTOR.
MINORU NAGASE
TOSHIYUKI MATSUOKA
BY Ralph W. McIntire, Jr.
ATTORNEY

| STAGE | FLIP-FLOP OUTPUTS | | |
|---|---|---|---|
| | A' | B' | C' |
| 0 | 0 | 0 | 0 |
| 1 | 0 | 0 | 1 |
| 2 | 0 | 1 | 0 |
| 3 | 0 | 1 | 1 |
| 4 | 1 | 0 | 0 |
| 5 | 1 | 0 | 1 |
| 6 | 1 | 1 | 0 |
| 7 | 1 | 1 | 1 |

Fig. 6

| STAGE | EFFECTIVE PISTON AREA | OUTPUT RATIO |
|---|---|---|
| 0 | 0 | 0/7 |
| 1 | (7-6) | 1/7 |
| 2 | (6-4) | 2/7 |
| 3 | (6-4) + (7-6) | 3/7 |
| 4 | 4 | 4/7 |
| 5 | 4 + (7-6) | 5/7 |
| 6 | 4+(6-4) | 6/7 |
| 7 | 4+(6-4) + (7-6) | 7/7 |

Fig. 7

VARIABLE LOAD BRAKE CONTROL APPARATUS

BACKGROUND OF THE INVENTION

In railroad operations, a special braking problem exists in that the effective brake forces must be adjusted to compensate for different vehicle load conditions in order to avoid dangerous and undesirable wheel slide, especially in passenger-carrying rail vehicles where the human element is a factor and the load differential between the extreme empty and load conditions is considerable. Devices heretofore employed to accomplish the function of sensing the vehicle load condition in order to permit adjustment of the brake forces have utilized a large number of movable parts, such as levers, etc. Due to manufacturing tolerances and wear due to friction, play develops at the points of connection between the movable parts sufficient to render the sensed load condition inaccurate within a relatively short period.

A further requirement of such load modified braking equipment is that of separating the load sensing means from the control section during vehicle movement to avoid jouncing of the vehicle from influencing the control section through the sensing means. Mechanical components such as wedge lock mechanisms used for the purpose of locking the sensed load setting into the control section, so that the sensing means may be separated therefrom during service, and not only subject to extreme rates of wear but are also responsible for a high incidence of mechanical damage.

In addition, where the load sensing, control section and locking or memory device are combined in a unitized construction, the resultant size of the equipment may create difficulties in installation, maintenance and handling procedures.

SUMMARY OF THE INVENTION

It is the object of the present invention to provide a detection apparatus in which different positions of a member movable in accordance with varying load conditions is sensed in terms of a reflected binary-weighted code, being particularly suitable for application as a variable load brake control in which those deficiencies stated above are overcome.

It is another object of the invention to provide a pure fluid logic encoder circuit for converting the reflected binary code into standard binary code form to which a fluid control portion of the system is responsive to vary output pressure in accordance with the registered displacement. According to one aspect of the invention, a displacement detector device is provided for mounting on a movable member, such as the sprung portion of a rail vehicle, said detector device having a sensing plate for extending into engagement with a reference point such as the unsprung portion of a rail vehicle in response to supply of fluid pressure to a control piston to which the sensing plate is secured. The sensing plate is provided with a plurality of openings arranged to quantify the sensing plate into different code stages. The openings are adapted to establish digital control of individual ones of a plurality of interruptable-type fluid jet sensors, such as to provide a binary code unique to the particular code stage of the sensing plate presented to the jet sensors, accordingly indicating the vehicle load condition.

The generated reflected binary code may be modified by an encoder section comprising pure fluid logic circuitry subject to the jet sensor outputs and designed to convert the reflected binary code into a corresponding standard binary code. A plurality of pure fluid flip-flop circuits are provided to provide memory of the effective encoder output, thereby permitting the displacement detector and encoder circuit to be separated during the period that car jounce would otherwise result in fluctuations in the output of a differential-type relay valve subject to the flip-flop memory. The relay valve output is accordingly limited to a percentage of its input, as dictated by the detected vehicle load condition.

Appropriate interlock circuitry including delay means is disclosed whereby driving power to the displacement detector, encoder circuitry, and to the flip-flop memory stage is controlled in accordance with operation of the vehicle doors, thereby providing proper sequencing for separating the load sensing and memory functions.

Other objects, features and attendant advantages of the present invention will become more readily apparent from the following more detailed description when considered with the accompanying drawings in which:

Figure 1:
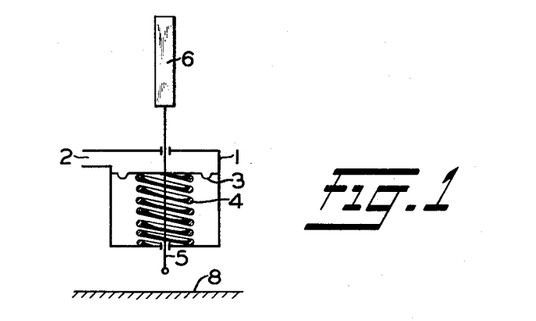
FIG. 1 is a diagrammatic view of a sensing plate as utilized in the present invention to indicate vehicle load conditions.

Referring to FIG. 1 of the drawings, a displacement detector device 1 is shown having a body which may be mounted in a suitable fashion to the sprung portion of a rail vehicle, said body having a supply port 2, a piston 3 subject to the supply of control fluid pressure via port 2, a spring 4 adapted to bias piston 3 in opposition to the force of control pressure thereon, a push rod 5 to which piston 3 is secured such as to extend rod 5 in response to the supply of fluid pressure at port 2, and a sensing plate 6 connected to piston 3 by a stem 7 passing through the detector body. Also represented in FIG. 1 is a stop plate 8, which may be secured to a suitable member associated with the unsprung portion of a rail vehicle for engagement by push rod 5.

In response to changes in the load of a rail vehicle, as by the exchange of passengers, the relative positions of the displacement detector 1 and stop plate 8 change in accordance with the resultant addition or loss in the passenger loads. The amount of this load change is represented by the position of the sensing plate 6 subsequent to piston 3 being deflected against the opposing force of spring 4 in response to supply of fluid pressure to port 2 until the extension of push rod 5 is limited by engagement with stop plate 8.

Figure 3:
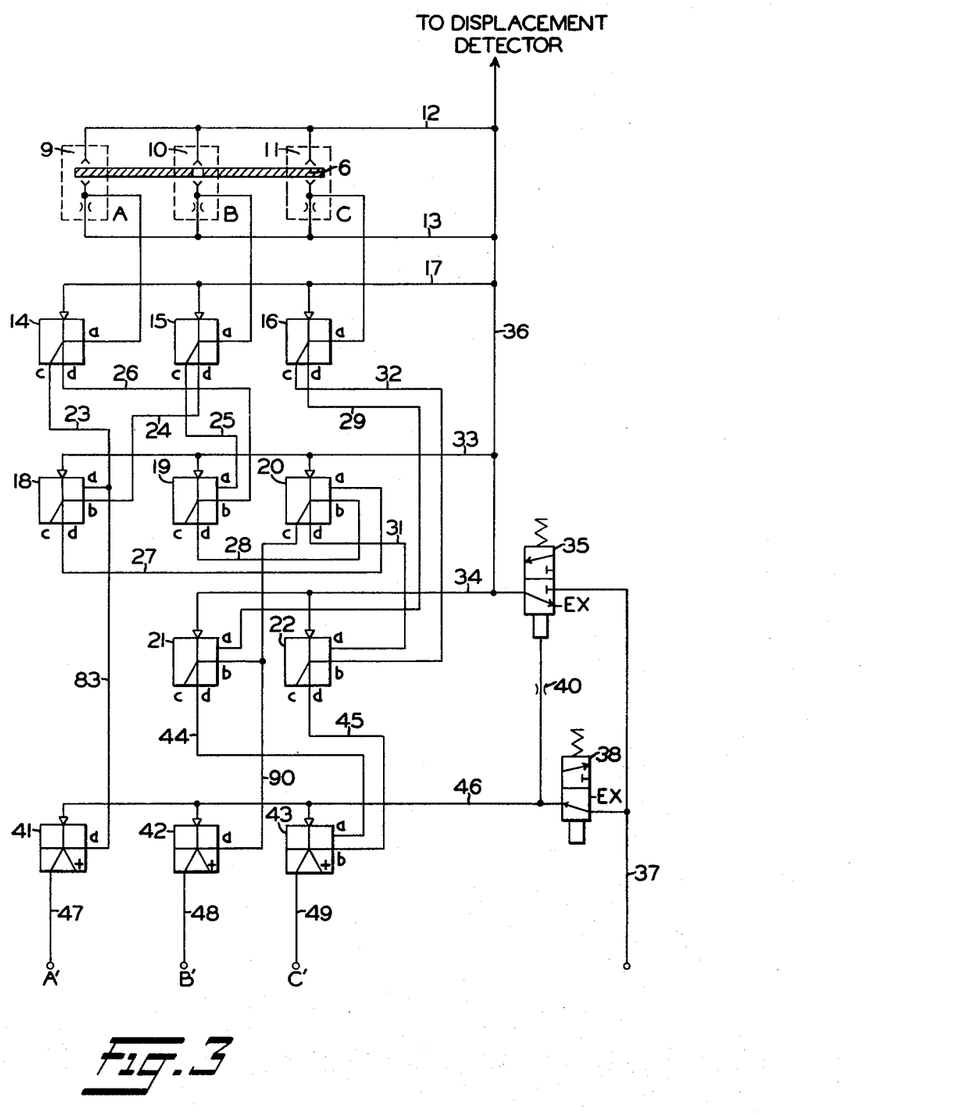
FIG. 3 is a system schematic including pure fluid logic circuitry comprising an encoder section and a memory stage of the invention.

The fluid logic circuit shown in FIG. 3 is used for converting to a standard binary code and storing the code information corresponding to displacement detected by the detector shown in FIG. 1, which is generated initially in the form of a reflected binary code.

Figure 2:
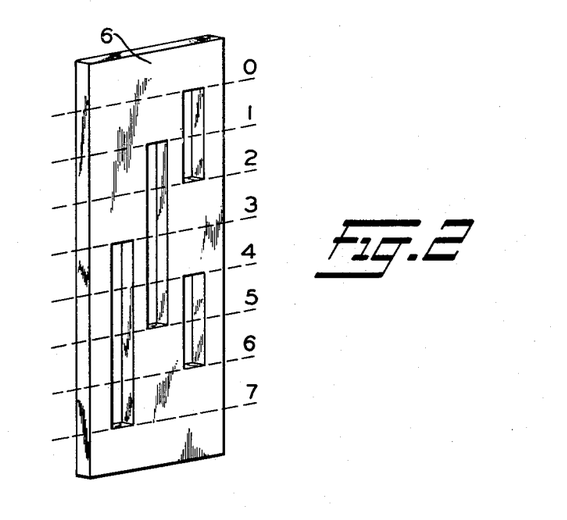
FIG. 2 is an enlarged diagrammatic view showing the coding configuration of the sensing plate of FIG. 1.

Comprising the detection section of the fluidic circuit of FIG. 3 are fluid jet sensors 9, 10 and 11 of the interruptable jet impact-type, each adapted to regulate the flow of pressurized fluid supplied via branch lines 12 and 13, in accordance with the position of sensing plate 6, which is movable within the air gap between the jet nozzles of the sensors by an amount corresponding to the amount of displacement caused by the load. Specifically, the sensing plate 6 is fitted with longitudinal slots, as shown in the illustration of FIG. 2, in positions that correspond to the pressurized fluid jets in the respective jet sensors 9, 10 and 11. The configuration of slots forms a reflected binary coded sensing plate 6 which, in accordance with being continuously displaced as a result of changes in the load on the car and owing to the form of the slots, results in the sensing plate being quantified in eight stages from stage 0 (empty load) to stage 7 (maximum load). When these slots in sensing plate 6 are in a position corresponding to the positions of the pressurized fluid jets in the fluid jet sensors, continuity of the pressurized fluid jets is established, resulting in a fluid pressure signal appearing at the output ends, A, B and C of the fluid jet sensors 9, 10 and 11.

Figure 5:
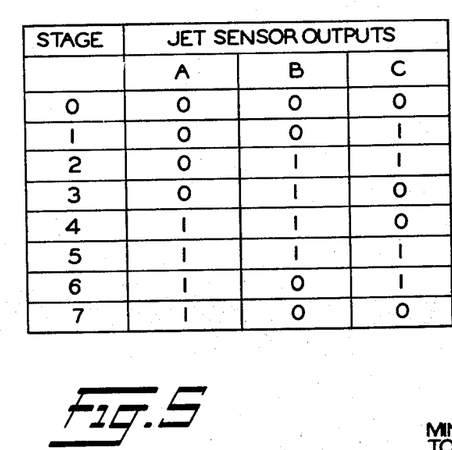
FIG. 5 is a truth table showing the output combinations resulting from a three variable input as represented in reflected binary code form, in accordance with the different stages of the sensing plate of FIG. 2.

If the presence and absence of an output from the fluid jet sensors is represented as the binary symbols "1" and "0", the correlation between the position of sensing plate 6, that is to say between the stage number, and outputs A, B and C of the fluid jet sensors will be as shown in FIG. 5.

This is tantamount to substituting the displacement of sensor plate 6 for changes in vehicle load, quantification into eight stages and conversion to a reflected binary code. As no more than a single bit changes in accordance with transition between adjacent stages, regardless of the conditions, the reflected binary code will always move directly to the neighboring level. This has the advantage, as will be hereinafter apparent, that there will be no extreme changes in output as a result of erroneous action in the control section.

Included in the encoder portion of the logic circuit of FIG. 3 are OR-NOR circuits 14, 15 16 comprising one input end a which is connected to the output of the fluid jet detectors 9, 10 and 11, respectively, and two output ends c and d. A branch line 17 supplies pressurized fluid to drive the OR-NOR circuits, 14, 15 and 16. Also included in the encoder portion and OR-NOR circuits 18, 19, 20, 21 and 22, each of which has two inputs a and b, a NOR output d and an OR output c.

The input a of OR-NOR circuit 18 is connected to the OR output c of OR-NOR circuit 14 through line 23, while input b is connected to NOR output d of OR-NOR circuit 15 through line 24. Input a of NOR-NOR circuit 19 is connected to OR output c of OR-NOR circuit 15 through line 25, while input b is connected to NOR output d of OR-NOR circuit 14 through line 26. Input a of OR-NOR circuit 20 is connected to NOR output d of OR-NOR circuit 18 through line 27, while input b is connected to NOR output d of OR-NOR circuit 19 through line 28.

Additionally, input a of OR-NOR circuit 21 is connected to NOR output d of OR-NOR circuit 16 through line 29, while input b is connected to OR output c of OR-NOR circuit 20 through line 30. Input a of OR-NOR circuit 22 is connected to NOR output d of OR-NOR circuit 20 through line 31 while input b is connected to OR output c of OR-NOR circuit 16 through line 32.

A branch line 33 supplies pressurized fluid to drive OR-NOR circuits 18, 19 and 20, while branch line 34 supplies OR-NOR circuits 21 and 22.

The pressurized fluid branch lines 17, 33 and 34, which drive the OR-NOR circuits, and pressurized fluid branch lines 12 and 13, which are used to drive the fluid jet sensors, are all connected to line 36 which is, in turn, connected to a pilot operated, spring returned, three-way control valve 35. In one position of valve 35, fluid pressure in line 36 is connected to exhaust, while in the other position, pressurized fluid in line 37, from a regulated low pressure fluid source (not shown) is connected to line 36. Operation of valve 35 may be accomplished by a solenoid operated, spring returned, three-way control valve 38, which may be operated, for example, in response to opening and closing the door operating switch of the vehicle. In one position of valve 38, fluid pressure is connected from line 37 to a line 39 and via a choke 40 to the pilot end of valve 35, while in the other position of valve 38, pressure in line 39 is connected to exhaust. In the absence of fluid pressure at the pilot operator of valve 35, fluid pressure is supplied from line 37 to line 36 via control valve 35. This occurs in the deenergized state of the solenoid operator of valve 38. On the other hand, fluid pressure communication between lines 37 and 36 is interrupted by valve 35 when pressurized fluid is established at the pilot operator thereof in accordance with the solenoid operator of valve 38 being energized.

Accordingly, when the vehicle doors are closed, control valve 35 is positioned to cut off supply of pressurized fluid to line 36, which is consequently vented, and when the doors are opened, the pressurized fluid is supplied to line 36 after a slight, constant delay imposed by the action of choke 40 in line 39.

A memory portion of the logic circuit comprises flip-flop circuits 41, 42 and 43 which function to store the information provided by the reflected binary code derived from the sensing plate 6 of the displacement detector and the fluid jet sensors, which code is converted by the aforesaid OR-NOR logic circuit into a standard binary code. These flip-flop circuits utilize a construction in which there is a preferred output in the direction of the + symbol when fluid pressure is supplied in the absence of a control input signal.

Input a of flip-flop circuit 41 is connected to OR output c of OR-NOR circuit 14 through lines 83 and 23 while the input end a of flip-flop circuit 42 is attached to OR output c of OR-NOR circuit 20 through lines 90 and 30. Additionally, input a of flip-flop circuit 43 is connected to NOR output d of OR-NOR circuit 21 through line 44 while input b is connected to NOR output d of OR-NOR circuit 22 through line 45.

In the illustration of FIG. 3, a line 46 is provided which supplies pressurized fluid to all of the flip-flop circuits and is connected to the output of control valve 38. There is no signal at the output ends of the flip-flop circuits 41–43 in the absence of fluid pressure supply to line 46. The outputs A', B' and C' of each of the flip-flop circuits 41–43 has the correlation shown in FIG. 6 with changes in vehicle load conditions. The table is in the form of a standard binary code which, as hereinafter explained, is converted from the reflected binary code shown in FIG. 5. Outputs 47, 48 and 49 of the flip-flop circuits, A', B' and C' supply the standard binary code to the fluid control section of FIG. 4. In accordance with the above explanation concerning operation of control valves 35 and 38, it will be seen that the flip-flop circuits operate only when the doors of the carriages are closed in response to which control valve 38 is effective to establish fluid pressure communication between lines 37 and 46, thereby sending the content of the memory to lines 47, 48 and 49. The flip-flop circuits are disabled due to line 46 being vented at control valve 38 during the period that the doors are open and the OR-NOR circuits are operating.

Figure 4:
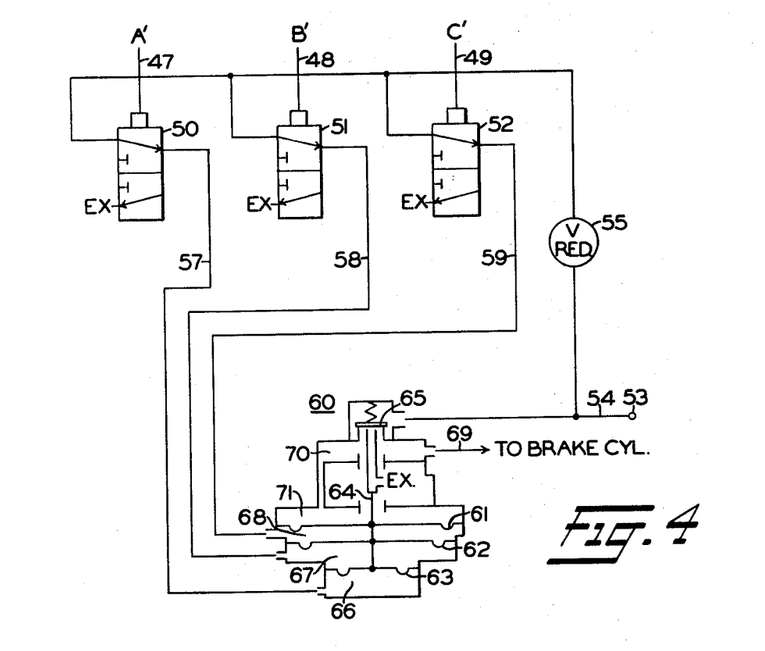
FIG. 4 is a diagrammatic showing the fluid power control section of the system.

FIG. 4 shows the fluid control section, which responds to changes in load that have been converted to a corresponding binary code and stored in the fluid logic circuit shown in FIG. 3, into decimal valves of fluid pressure for control of brake pressure. It also provides power amplification.

The fluid control section is comprised of interface valves 50, 51 and 52, which are pilot operated two-position, three-way valve devices adapted to convert the low pressure fluid signals from flip-flop circuits 41, 42 and 43 to high pressure fluid signals. The interface valves are positioned when they receive a "1" input from outputs A', B' and C' of the flip-flop circuits to establish fluid pressure communication between a high pressure fluid source 53 via line 54, a pressure reduction valve 55 and line 56, and the valve output lines 57, 58 and 59.

Figure 7:
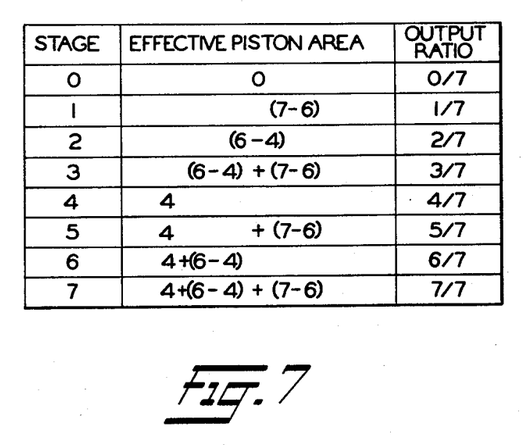
FIG. 7 is a table showing the different effective piston ratios of the relay valve of FIG. 4, as developed in accordance with the system outputs of FIG. 3.

Also comprising the fluid control section is a well-known differential-type relay valve device 60 having a piston assemblage wherein pistons 61, 62 and 63 thereof are provided with a surface area ratio of 7:6:4. The piston assemblage further includes a push rod 64 attached to the said pistons and a valve 65 operative in response to movement of the piston assemblage. The output from interface valves 50, 51 and 52 is supplied to the corresponding piston chambers 66, 67 and 68. The ratio between the output of the fluid pressure that is delivered through line 69, and the regulated fluid pressure input via line 54 is the so-called output ratio of relay valve 60, as shown in the table of FIG. 7 and in accordance with the outputs provided by interface valves 50, 51 and 52. As a result of the combined inputs supplied to piston chambers 66, 67 and 68, in accordance with the interface valve outputs, there are corresponding changes in the effective surface area ratios of the pistons that work upwards through push rod 64. This cases variations in the degree of fluid pressure supplied via valve 65, as hereinafter explained, causing the pressurized fluid to flow into line 69 in proportions specified for the given vehicle load condition.

The fluid pressure imposed on line 69 is fed back through line 70 to work on upper piston chamber 71 thereby causing push rod 64 to stop where the downward pressure balances the force of the upward pressure working through push rod 64. In this way, the output can be changed in eight stages of displacement between the 0 stage (empty load) to the seventh stage (full load).

The construction of the displacement detector, the fluid logic circuit and the fluid control section is as explained above. Operation will be explained next. Initially as the vehicle stops in the station and the doors are opened, the solenoid operator of control valve 38, which is connected to the switch on the door, is deenergized, thereby permitting the control valve to be spring positioned such as to interrupt communication between line 37, that is connected to the low pressure fluid source and line 46. As a result, fluid pressure is cut off from the supply ports of flip-flop circuits 41, 42 and 43, resulting in the absence of an output therefrom to lines 47, 48 and 49. This is equivalent to an 0 stage (empty carriage) output. Together with line 46, line 39 also loses its pressurized fluid, allowing pilot operated control valve 35 to be spring positioned such as to establish fluid pressure communication between line 37, which is connected to the low pressure fluid source, and line 36. As a result, driving fluid pressure is applied to the supply ports of the OR-NOR circuits 14, 15, 16, 18, 19, 20, 21 and 22 and the fluid jet detectors 9, 10 and 11 through the branch lines 17, 33, 34, 12 and 13, placing these circuits in the operating mode.

Concurrently with the opening of the doors, fluid pressure effective in line 36 is supplied via port 2 to the upper chamber of piston 3 in the displacement detector. Piston 3 forces push rod 5 down until its tip comes in contact with the plate 8 on the truck, converting the amount of displacement resulting from load on the vehicle to a proportional displacement of sensing plate 6.

Assuming that the displacement of sensing plate 6 is such as to locate the portion thereof represented by stage 3 in a position opposite to the fluid jet path of sensors 9, 10 and 11, when detector plate 6 is in this position, the slots therein are disposed relative to the fluid jet sensors such that only continuity of the fluid jet of sensor 10 is maintained, resulting in emission of pressurized fluid only to output B. On the other hand, the jet flow at sensors 9 and 11 is interrupted by the sensing plate, resulting in the absence of an output therefrom. Assuming now that the state in which there exists pressurized fluid in a channel is represented by the binary symbol "1" and the state in which a line absent of fluid pressure is represented by the symbol "038 , the respective outputs A, B and C of fluid jet detectors 9, 10 and 11 will be "0", "1" and "0". This is equivalent to the third stage in the reflected binary code shown in FIG. 5, in accordance with the assumed condition.

Accordingly, the input to OR-NOR circuits 14, 15 and 16 will be "0", "1" and "0" at OR output c of OR-NOR circuit 14 and "1" at NOR output d. OR output c of OR-NOR circuit 15 will be "1", while OR output d will be "0". Also, "0" will appear at OR output c of OR-NOR circuit 16 while "1" will appear at NOR output d. The OR output of OR-NOR circuit 14 and the NOR output of OR-NOR circuit 15 will be "0", and will appear respectively at inputs a and b of OR-NOR circuit 18. This will give "1" at NOR output d of OR-NOR circuit 18 and, on the basis of a similar logic, "0" will appear at NOR output terminal d of OR-NOR circuit 19. Accordingly, "1" will appear at OR output terminal c of OR-NOR circuit 20 while an "0" output will appear at NOR output terminal d.

Next, OR-NOR circuit 21 will receive the "1" NOR output of OR-NOR circuit 16 and the "1" OR output of OR-NOR circuit 20 causing an "0" output at its NOR output terminal d. OR-NOR circuit 22 receives the "0" output from both OR-NOR circuits 16 and 20, causing a "1" output at its NOR output terminal d.

Accordingly, an "0", "1" and "1" input will be applied to each of the input lines 83, 44 and 45 to flip-flop circuits 41, 42 and 43, respectively. Since, as stated before, no pressurized fluid is being supplied to the supply ports of flip-flop circuits 41, 42 and 43, no output is obtained.

Now, when the vehicle is supposed to start and the doors are closed, the solenoid operator of control valve 38 receives an electric signal to that effect, repositioning valve 38 so as to communicate fluid pressure in line 37 from the low pressure fluid source to line 46 and to line 39. Each of the supply ports of flip-flop circuits 41, 42 and 43 are consequently pressurized and as a result of the aforesaid input to these circuits, an output appears in lines 48 and 49, while no output occurs at line 47. Accordingly, as shown in FIG. 6, the outputs, A', B' and C' of lines 47, 48 and 49 will be, respectively, "0", "1" and "1" at stage 3.

When the pressurized fluid is fed to line 46, the output of each of the OR-NOR circuits is applied to each of the flip-flop channels 41, 42 and 43. After a predetermined delay imposed by choke 40, the pressurized fluid passes through line 39 and acts on the pilot operator of control valve 35, which is accordingly positioned to vent like 36. Consequently, the supply of pressurized fluid to the supply ports of each of the OR-NOR circuits and the fluid jet detectors is terminated, while concurrently, the pressurized fluid in the upper piston chamber of the displacement detector is also discharged, thereby returning the detector and logic circuitry to a deactivated mode. The vehicle load condition sensed, however, is retained by the memory ability of the flip-flop circuits 41, 42 and 43. As stated above, the displacement detector, in cooperation with the fluid logic circuit, detects the vehicle load condition as represented by the fluid jet sensor outputs and encoded by the fluid logic circuit during the time that the doors are open and the carriage is at a standstill. Conversely, no fluid pressure is fed to the flip-flop circuits and their outputs are all "0" corresponding to the 0 stage signal (empty vehicle condition) when the vehicle doors are closed. Supply of fluid pressure continues to be fed to each of the flip-flop circuits, causing them to generate an output signal corresponding to the input signal that has already been given to them. By reason of the fact that the supply of pressurized fluid to the displacement detector, the fluid jet sensors and the logic circuits is terminated, erroneous displacement signals resulting from vibration during the operation of the vehicle are suppressed.

Thus, when the doors are opened, changes in load are converted to and detected as reflected binary codes, which are in turn converted to standard binary codes and stored in the flip-flop circuits as the doors are closed.

Figure 6:
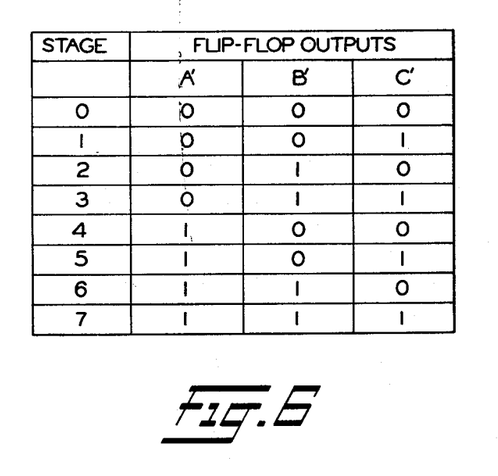
FIG. 6 is a truth table showing the output combinations resulting from a three variable input as represented in standard binary code form, in accordance with the corresponding stages of the reflected binary code.

The outputs A', B' and C' shown in FIG. 6 are obtained, in the form of standard binary codes which require conversion into decimal numbers for the actual control of brake pressure, etc. This is accomplished as follows. The output of low fluid pressure from lines 47, 48 and 49 is applied, respectively, to interface valves 50, 51 and 52, resulting in an output at lines 57, 58 and 59 in the form of high fluid pressure. In the case of stage 3 where the signals "0", "1" and "1" appear at A', B' and C', interface valves 51 and 52 produce high pressure fluid at lines 58 and 59. Since lines 58 and 59 are connected to piston chambers 67 and 68 in relay valve device 60, the high pressure fluid causes an upward force on the piston assemblage in accordance with the effective area ratio of the pistons. As shown in FIG. 7, this effective area is the sum of the difference between the areas of piston 62 and piston 63 (6–4) and the difference between the areas of piston 61 and piston 62 (7–6) or 3. The force which works upward, and which is proportional to the effective area ratio, forces push rod 64 upward, opening value 65 and causing high pressure fluid to be connected from line 54 into line 69. The high pressure fluid that is fed into line 69 passes through line 70 into upper piston chamber 71 where it acts to force the piston down. The valve is closed at the point at which the downward force and the upward force balance, causing the fluid in line 69 to have, in the assumed condition, a pressure 3/7 that of the fluid in lines 58 and 59. This is utilized as the brake pressure for the vehicle in a practical example of the invention.

When, it is desirable to have 1/7 pressurized fluid at 0 stage (empty car) in line 69, a spring (not shown) which has a spring strength corresponding to an area ratio of 1, may be inserted into piston chamber 66. When this is done, it is possible to obtain pressurized fluid at output ratios of 1/7–8/7 throughout the eight stages from stage 0 through stage 7.

The explanation above covers the condition in which the section of the sensing plate 6 corresponding to stage 3 is aligned with jet sensors 9, 10 and 11; the other stages, however, all pass through exactly the same processes. In the above example, the system is explained in accordance with a three variable binary code. However, the system may be expanded to accommodate more variables if desired by increasing the number of fluid jet sensors to a total of $n$, with a corresponding change in the logic plate configuration and provision of additional circuits, as appropriate, to give $2^n$ detection stages, making it possible to detect minute displacements with improved resolution.

In the unlikely event of a failure of the circuits shown in FIG. 3 and the resultant failure of an output signal to appear in the flip-flop circuits, the signal for the lowest stage corresponding to an empty vehicle is still maintained. For this reason, the output of this circuit is particularly suitable for use in brake systems, as described, where fail safe system operation is required. Further, since reflected binary codes are used as the initial displacement detection signal, stabilized detection is possible since problems with signal switching during detector plate transition does not occur.

The above practical example has been an explanation of a detector device for weight changes in railroad vehicles, however, this invention is not limited to that type of equipment alone. It can be applied to any other kind of displacement detection device and may be used for the detection of other physical quantities such as position displacement, or weight.

As explained above, the displacement detector device covered by the present invention is formed almost entirely of non-sliding parts; accordingly, mechanical play, friction, etc. does not develop. For this reason, detection is accurate and maintenance is improved. Furthermore, a mechanically simplified system of reduced size made possible by the utilization of a fluid logic circuit provides for ease of packaging and installation.

In addition, since fluid circuits are utilized, the system can be connected to a fluid control section by fluid circuits. For this reason, the detector section and the fluid control section need not be unitized, but a small detector section can be located independently when necessary due to limitations on space.

Having now described the invention, what we claim as new and desire to secure by Letters Patent, is:

1. A variable load brake control system for a vehicle comprising:
    a. code generator means for providing a unique code signal in accordance with the load condition of said vehicle including:
        i. a sensing plate movable in accordance with the load condition of said vehicle, said sensing plate having code means corresponding to varying degrees of vehicle load so as to selectively dispose in a predetermined position a different code in accordance with the degree of movement of said plate, and
        ii. detector means for providing said unique signal corresponding to the code disposed in said predetermined position, and
    b. power means responsive to said unique code signal for controlling the degree of brake application on said vehicle.

2. A variable load brake control system, as recited in claim 1, wherein said detector means comprises a plurality of digital control elements in cooperative relationship with said sensing plate and individually operative to a logical "1" or a logical "0" state in accordance with the character of said code means.

3. A variable load brake control system, as recited in claim 2, wherein said sensing plate is formed with a plurality of openings to provide said code means, the pattern of said opening quantifying said sensing plate into a plurality of code stages, said control elements being operative in accordance with the presence or absence of said openings in each of said stages to provide said unique code signal in a first code form.

4. A variable load brake control system, as recited in claim 3, wherein said code generator means further comprises encoder means responsive to said detector means for converting said unique code signal from said first code form to a second code form.

5. A variable load brake control system, as recited in claim 4, said vehicle having a first and a second operating condition and further comprising:
    a. memory means responsive to said encoder means for providing said unique code signal only when in an active condition,
    b. control means operable in said first condition of said vehicle to deactivate said memory means, and operable in said second condition to effect said active condition of said memory means and to concurrently prevent said encoder means from providing said unique code signal, and
    c. means for delaying said control means from operating to prevent said encoder means from providing said unique code signal for a limited duration incident to transition of said vehicle from said first condition to said second condition.

6. A variable load brake control system, as recited in claim 1, said vehicle having a first and second operating condition and further comprising control means operative for providing said control signal only in said first condition.

7. A variable load brake control system, for a vehicle having a pair of members, at least one of which is movable relative to the other an amount corresponding to the vehicle load condition, said system comprising:
    a. code generator means for monitoring the relative movement between said members, including:
        i. detector means comprising a plurality of fluid jet sensors having an air gap across which the presence or absence of fluid flow is effective to operate said sensors to a logical "1" or logical "0" state, and
        ii. sensing plate means mountable on one of said members for movement relative thereto toward engagement with the other of said members and being formed with a plurality of openings for quantifying said sensing plate to provide a plurality of code stages, said sensing plate means being operable within the air gaps of said sensors to render said openings effective to control fluid flow across said air gaps to provide a unique code signal in accordance with the code stage with which said sensors are aligned consequent to said sensing plate engaging said other one of said members, and
    b. power means responsive to said unique code signal for controlling the degree of brake application on said vehicle in accordance with the vehicle load condition.

8. A variable load brake control system, as recited in claim 7, whereby said openings providing said code stages are arranged to render said sensors effective to generate said unique code signal in a first code form.

9. A variable load brake control system, as recited in claim 8, further comprising fluid logic encoder means responsive to said logical "1" or logical "0" state of said sensors for converting said unique code signal from said first code from to a second code form.

10. A variable load brake control system, as recited in claim 9, wherein said power means comprises:
    a. interface valve means piloted in response to said unique code signal provided by said encoder means to provide a plurality of outputs pressurized in accordance with said unique code signal in said second code form, and
    b. relay valve means for effecting the supply and release of fluid brake pressure, said relay valve means having control piston means subject to said outputs to vary the effective brake pressure in accordance with the degree of vehicle load.

11. A variable load brake control system, as recited in claim 10, wherein said relay valve means comprises a differential piston abutment providing a plurality of fluid pressure chambers, each of said chambers being communicated with a different output of said interface valve means for controlling said piston abutment to vary brake pressure in accordance with said unique code signal.

12. A variable load brake control system, as recited in claim 10, wherein said interface valve means comprises a plurality of fluid pressure piloted valve devices corresponding in number of said plurality of fluid jet sensors.

13. A variable load brake control system, as recited in claim 9, said vehicle having a first and a second operating condition and further comprising:

a. memory means responsive to said encoder means for providing said unique code signal only when in an active condition,
b. control means operable in said first condition of said vehicle to deactivate said memory means, and operable in said second condition to effect said active condition of said memory means and to concurrently prevent said encoder means from providing said unique code signal, and
c. means for delaying said control means from operating to prevent said encoder means from providing said unique code signal for a limited duration incident to transition of said vehicle from said first condition to said second condition.

* * * * *